T. F. MULLANEY & W. J. QUINN.
METHOD OF AND APPARATUS FOR PROPORTIONING THE LOAD BETWEEN A PLURALITY OF SERIES MOTORS.
APPLICATION FILED APR. 18, 1916.
1,278,192.
Patented Sept. 10, 1918.
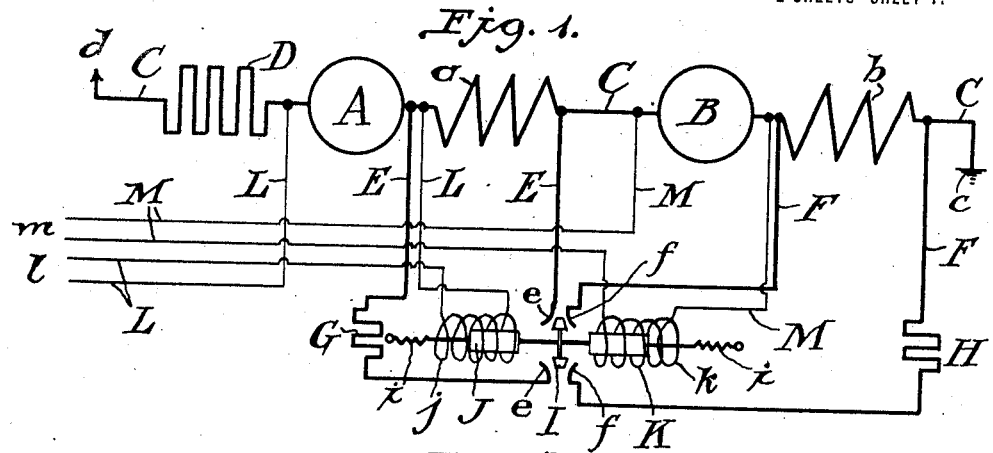
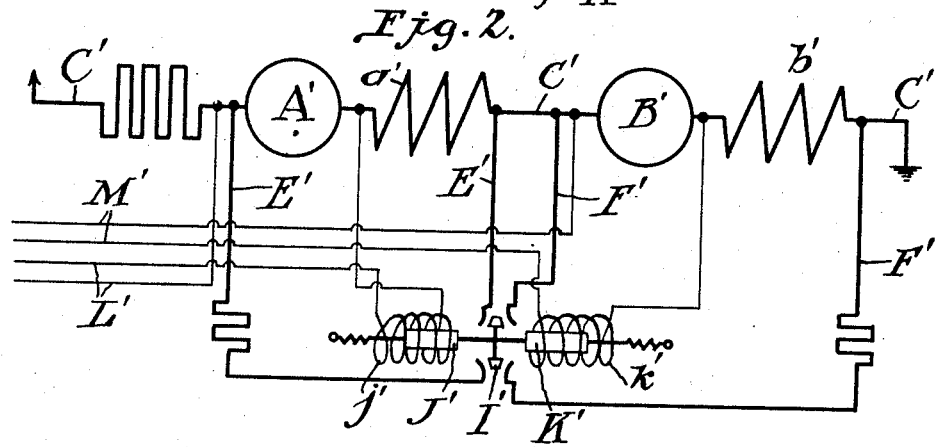
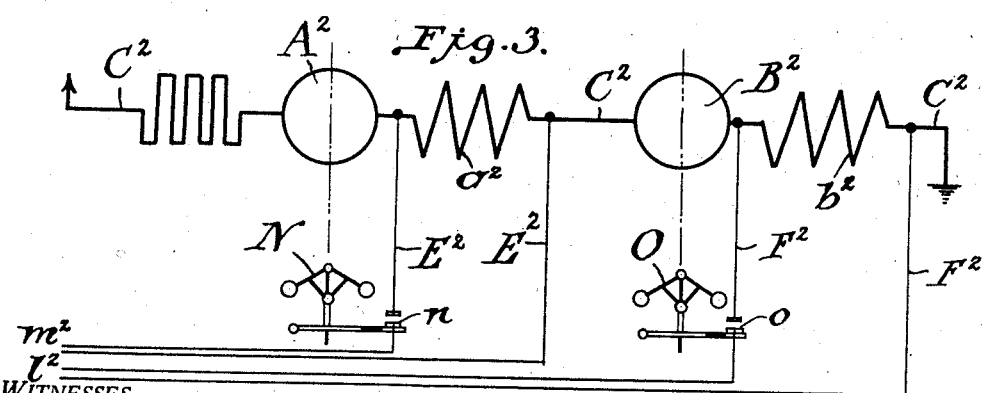
WITNESSES:
INVENTORS
Thomas F. Mullaney and
BY Walter J. Quinn.
Attorneys

UNITED STATES PATENT OFFICE.

THOMAS F. MULLANEY AND WALTER J. QUINN, OF NEW YORK, N. Y.

METHOD OF AND APPARATUS FOR PROPORTIONING THE LOAD BETWEEN A PLURALITY OF SERIES MOTORS.

1,278,192.   Specification of Letters Patent.   Patented Sept. 10, 1918.

Application filed April 18, 1916. Serial No. 91,864.

*To all whom it may concern:*

Be it known that we, THOMAS F. MULLANEY and WALTER J. QUINN, citizens of the United States, residing in the city of New York, counties of New York and Bronx, respectively, State of New York, have invented a certain new and useful Method of and Apparatus for Proportioning the Load Between a Plurality of Series Motors, of which the following is a specification.

This invention is a method of, and apparatus for, proportioning the load between a plurality of series motors, and the object of the invention is to proportion or equalize the loads and speeds of a plurality of motors connected in series. Although adapted for general application in the electrical art, the present invention is particularly applicable to electric car controlling circuits.

In the customary operation of electric cars, where two or more motors of the series type are used for a car, very considerable trouble and inefficiency are occasioned during periods of acceleration and while the motors are being operated in series, due to one or more of the motors running at greater speed than the balance of the motors. This inequality of speed is attributable to a number of factors, the principal one of which is the difference in the adhesion or friction between the rail and the individual wheels of the car with which the motors are respectively associated. This variation in speed results in decreased efficiency in the traction power of the car and precludes its effective operation, particularly during the starting thereof.

We have discovered by extensive experiments that the disadvantages referred to may be overcome by regulating the speeds of the motors individually and automatically, so that each motor bears its proportion of the total load.

When inequalities of speed occur in the individual motors, the voltage impressed across all of the motors in series is divided disproportionately between the motors, with the result that the motor or motors running at relatively higher speeds have a greater voltage impressed across them than the motor or motors running at the low speed or speeds. The voltage across any individual motor, connected as aforesaid, is approximately proportional to the counter E. M. F. developed by the said motor, and, in order to secure equality of speed between the several motors, it is necessary to equalize the counter E. M. F. developed by each of the motors.

With the foregoing considerations in mind, the present invention embodies a method of, and means for, equalizing or balancing the counter E. M. F. of the said motors by reducing, automatically, the counter E. M. F. of the motor or motors running at relatively higher speeds than the other motors in circuit, while the counter E. M. F. of such other motors is increased.

Features of the invention, other than those specified, will be apparent from the hereinafter detailed description taken in conjunction with the accompanying drawing.

The accompanying drawing illustrates different systems of wiring whereby the objects of this invention may be practically carried out, but the showing made is to be understood as illustrative, only, and not as defining the limits of the invention.

Figure 1 is a diagrammatic showing of a system of wiring and assemblage of electrical elements adapted to carry out the method of the present invention.

Fig. 2 shows a modified form of wiring adapted to accomplish the same result.

Fig. 3 is also a diagrammatic showing of a system of wiring embodying mechanically operated means for governing certain circuits embodied in said system.

Figure 4:
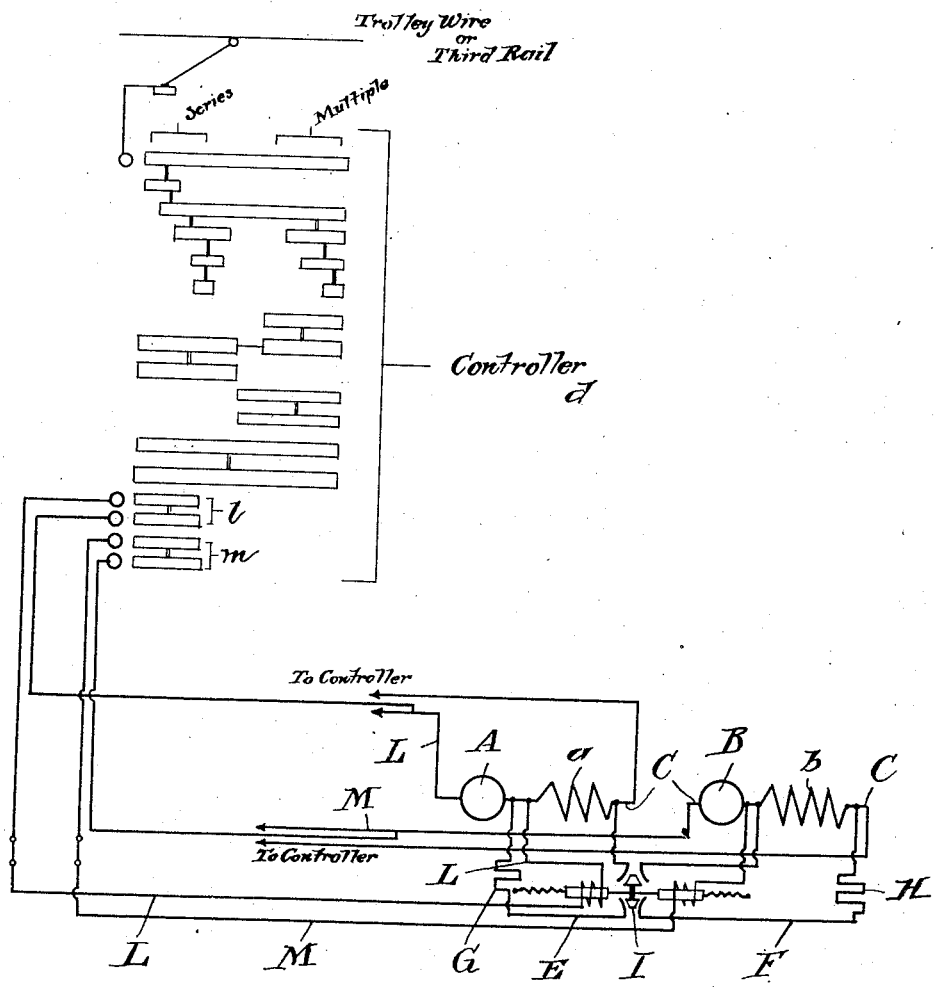
Fig. 4 is a fuller showing of the system of Fig. 1 illustrating the manner in which said system is governed from a car controller.

Referring to Fig. 1 of the drawing, wherein a system of wiring for practising the method of this invention, in one of its forms, is shown, A and B designate the armatures of two motors, with which are associated the series field coils $a$ and $b$, respectively. The two motors are connected in series in a circuit C, one end of which is grounded at $c$, or otherwise connected to the return circuit, while the other end of the circuit leads, through a suitable starting resistance D, to the standard car controller at $d$ in Fig. 1 and shown in detail in Fig. 4. The circuit is completed, as in other car operating systems, through the controller, which is in electric connection with a suitable source of current supply, either carried by the car or supplied from a central station.

In the embodiment of the invention illustrated in Fig. 1, the equalizing of the speeds of the motors is accomplished by shunting current around the field coils of the motor which is operating at excess speed. This is accomplished through the medium of shunt circuits E and F associated with the field coils *a* and *b*, respectively. Shunt circuit E is cut into circuit C at the opposite ends of field coil *a*, preferably includes suitable resistance G, and is connected to two spaced contacts *e*. Shunt circuit F similarly cuts into circuit C at the opposite ends of field coil *b*, preferably includes suitable resistance H, and is connected with two spaced contacts *f*.

The pairs of contacts *e e* and *f f* are placed in juxtaposition, and between said pairs a common, movable switch member I is positioned. Switch I and contacts *e e* and *f f* are so associated and proportioned that, when the switch is moved in one direction, shunt circuit E is completed, while movement in the opposite direction will cause the completion of shunt circuit F.

Various means may be employed to complete the circuits as described, but, in Fig. 1, the exemplification of this means is in the form of two opposed solenoids embodying, generally, movable cores J and K, and operating coils *j* and *k*. Cores J and K are positively secured to switch I from opposite sides thereof so that the operation of core J, through the energization of its associated coil *j*, will move switch I into engagement with contacts *e e* and complete circuit E. In like manner, the operation of core K under the influence of its coil *k* will shift said switch into engagement with contacts *f f* to complete circuit F. The switch is normally maintained in neutral position, *i. e.*, in a position wherein it is in engagement with neither of the contacts, by means of two opposed tension springs *i*, which exert a balanced tension on the opposite ends of cores J and K.

In order that the governing of the motors may be entirely automatic, each solenoid is controlled from the motor whose shunt circuit it controls. To this end, coil *j* is included in, and is energized from, a circuit L, which cuts into circuit C on either side of motor armature A. In like manner, coil *k* is included in, and is energized from, a circuit M, which cuts into circuit C at either side of motor armature B. Circuits M and L are normally broken at *m* and *l*, but are adapted to be closed by fingers on the car controller, which fingers engage with contacts as shown at *m* and *l* in Fig. 4, with which the respective circuits M and L are in electrical connection, in all series positions, particularly during the starting operation of the car.

The parts are so organized, however, that the circuits M L are broken or rendered "dead" when the motors are thrown from "series" into "multiple" and are maintained dead until said motors are subsequently returned to "series", as will be manifest from Fig. 4.

Assuming, therefore, that the car operator has shifted the manually operative lever of the car controller into such position as to close circuits M and L at *m* and *l*, and said controller is so associated with circuit C as to complete the same, it will be manifest that the car-operating electric current fed through circuit C will not all pass directly through said circuit, since, obviously, a portion of the current will be shunted around motor armatures A and B of the motors through circuits L and M, respectively. During the passage of such current, the solenoid coils *j* and *k* will be energized and will exert influence upon their respective cores J and K.

This is the normal passage of the current during the starting operation of the car, and, if the wheels of the car with which the two motors are associated have an equal traction and start up simultaneously, the counter E. M. F. of motor armatures A and B will be approximately balanced, with the result that the current flowing through the solenoid coils *j k*, which are respectively energized from these motor armatures, will be in a balanced condition, as will be the inductive forces operating upon the cores of these solenoids. Accordingly, no movement will be imparted to said cores and switch I will be idly held in a neutral position by the balanced springs *i*.

Assume, however, that for some well known reason, *e. g.*, that the adhesion between the rails on which the car runs and the individual wheels of the car with which the motors are associated differs, the wheels associated with motor armature A spin around without gaining sufficient traction to start the car, while the wheels associated with motor armature B have proper adhesion with the rails and thus serve, in a measure, to stall motor armature B, while motor armature A operates at a comparatively excessive speed. Under the conditions specified, it will be manifest that the counter E. M. F. developed by motor armature A will be greatly in excess of that developed by motor armature B, and this results in increased energization of solenoid coil *j* over that of solenoid coil *k*, in consequence of which the balanced condition between the solenoids no longer exists and the excess induction of coil *j* shifts its core J to a position wherein switch I will bridge the contact *e*. Shunt circuit E will thus be completed, so that a portion of the current flowing through circuit C will be shunted around the field coil *a* of motor armature A. While some of the current will continue to pass through coil *a*, considerable will pass through the shunt circuit E, and the amount of current which passes through this shunt circuit may be governed or regulated by a suitable resistance G included therein.

During this operation, shunt circuit F of the other motor remains deënergized, so that, by this diminishing the current flowing through field coil *a*, without operatively regulating the current flowing through the other motor in the circuit, a reduction in the field flux of the motor running in excess is accomplished, and there is, therefore, a reduction in the counter E. M. F. developed by said motor. In consequence of this, the speed of motor armature A diminishes and motor armature B, which was running at a decreased speed, is accelerated. Because of the fact that the voltage applied through circuit C to both of the motors in series remains the same, the lower speed motor must assume an increased amount of voltage, equal to the decrease in the counter E. M. F. of the motor running at increased speed and acted upon by the shunt circuit as described. This change in relations continues until both the motors are operating at approximately the same speed and counter E. M. F., at which time the current flowing through solenoid circuits M L reaches a balanced condition and moves switch I into a neutral position, thereby breaking shunt circuit E. This is because of the fact that the solenoids are so proportioned that, when all the motors are developing approximately equal voltage, switch I is in a neutral position and the shunting does not take place. It is only when unequal voltage is generated by either motor that the shunting device associated with that particular motor is called into operation.

It will be understood that, if the conditions were reversed, *i. e.*, motor armature B operating at a higher speed and developing greater voltage than motor armature A, shunt circuit F would be called into play in the same manner as has been described relative to the operations of shunt circuit E. Thus, any number of motors included in circuit C may be governed in an entirely automatic and positive manner to establish at all times while the motors are operating in series, a normal state of balance or equilibrium between the motors. As stated, this is of particular advantage in car controlling devices, since, if the wheels associated with one motor cannot obtain the proper traction, the electric energy need not be idly spent in spinning such wheels to accomplish no result. Said electric energy is concentrated upon the motor associated with the wheels which are in a position to obtain the necessary traction. In this manner, economy of current is obtained and the car may be started with efficiency and dexterity.

In the fore-going description, the manner of equalizing or proportioning the work of a plurality of motors connected in series consists in shunting the field coils of the motors running in excess by a system of wiring shown in Fig. 1. In Fig. 2 of the drawing is illustrated a system wherein the same result may be accomplished in substantially the same way, the only difference between the systems shown in Figs. 1 and 2 being that, in the latter system, the shunt circuit F′ is cut into the main operating circuit C′ at opposite sides of the motor armature B′ and its coöperating field coil *b′*. In like manner, shunt circuit E′ is cut into circuit C′ at opposite sides of the motor armature A′ and its coöperating field coil *a′*. Thus, instead of merely shunting the field coils of the motor which is operating at excess speed, as in the system shown in Fig. 1, the entire motor which is operating at excess speed is shunted in the system of Fig. 2. Solenoid coils *j′ k′*, their coöperating cores J′ K′, solenoid controlled switch I′, and the solenoid controlling circuits M′ and L′ operate, and are energized, in the same manner as the corresponding parts of the system of Fig. 1.

In the systems of Figs. 1 and 2, the automatic control is accomplished in a purely electrical manner, but in Fig. 3 is shown a system wherein the same results may be obtained by the employment of mechanical expedients. In circuit $C^2$, which corresponds to circuits C and C′ hereinbefore described, are included motor armatures $A^2$ and $B^2$, and their associated field coils $a^2$ $b^2$. Coöperating with the shafts of motor armatures $A^2$ $B^2$, or with the axles of the car, and actuated thereby, are centrifugal governing devices N O which control circuit-closing switches *n o* included in shunt circuits $E^2$ $F^2$, respectively. The centrifugal governor controlled switches are so associated with the motor armatures that, when the speed of the armature exceeds a predetermined maximum, the governor automatically closes the switch and completes the shunt circuit. The shunt circuits are normally broken at $m^2$ $l^2$ but are adapted to be closed at these points by fingers on the movable part of the car controller in the same manner as specified relative to the closing of circuits M and L of the system of Fig. 1.

In Fig. 3, for illustrative purposes, shunt circuits $E^2$ $F^2$ are shown as adapted, when completed, to shunt the current around the field coils $a^2$ $b^2$, respectively, of the motors, after the manner of the system of Fig. 1. However, if desired, the shunt circuits may be connected after the manner of the system of Fig. 2, *i. e.*, in such manner as to cut out the entire motor when operated. It will be understood that, if desired, suitable resistances, not shown, but corresponding to resistances G G' and H H', may be included in shunt circuits E² and F², respectively.

Any one of the systems hereinbefore described will operate perfectly to equalize or balance the counter E. M. F. or speeds of two or more motors, and, as a matter of fact, different electrical connections, as well as different mechanical means associated therewith, may be employed in accomplishing this result. The showing made, therefore, is to be understood as illustrative of the invention, which invention is as broadly novel as is commensurate with the appended claims.

Moreover, while the invention has been specifically described as adapted for controlling circuits of electric cars, its use is not limited to this specific environment, as it is applicable to various uses throughout the electrical art generally; e. g., it might be employed in electrically driven automobile trucks, electric locomotives, or any other environment wherein it is desired to equalize or proportion the load or speed of motors.

Having thus fully described the invention, what we claim as new, and desire to secure by Letters Patent, is:

1. The hereindescribed method which consists in governing, by controlling circuits, the magnetic flux of two or more motors connected in series so that the work of said motors is equalized or proportioned, thereafter changing the connections of the motors from series to multiple, and simultaneously rendering the controlling circuits dead and maintaining them dead until the motors are returned to series connection.

2. An electric motor controlling system embodying two motors, means for successively connecting said motors in series and multiple, a shunt circuit associated with each motor and adapted to divert a portion of the operating current from passing therethrough, a switch for governing said shunt circuits, electric circuits for controlling the operations of the switch, which controlling circuits are energized by the counter E. M. Fs. of the respective motors and means, associated with the means for successively connecting the motors in series and multiple, for rendering said controlling circuits operative while the motors are in series, and maintaining them dead while the motors are in multiple.

3. An electric motor controlling system embodying a plurality of motors, means for successively connecting said motors in series and multiple, a shunt circuit associated with each motor and adapted to divert a portion of the operating current from passing therethrough, switch mechanism for individually rendering said shunt circuits operative or inoperative, and means, controlled by the difference in speed of said motors and consequent difference in counter E. M. F., for governing the operation of the switch mechanism, whereby the work of said motors is equalized and proportioned, in combination with means, coöperating with the means for successively connecting the motors in series and multiple, for maintaining said shunt circuits operative while the motors are in series and rendering them inoperative while the motors are in multiple.

In testimony whereof we have signed our names to this specification.

THOMAS F. MULLANEY.
WALTER J. QUINN.